United States Patent
Yu et al.

(10) Patent No.: US 12,374,741 B2
(45) Date of Patent: Jul. 29, 2025

(54) DUSTPROOF SAFETY FEEDING DEVICE FOR POWER BATTERY BLACK POWDER ACID LEACHING AND FEEDING

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

(72) Inventors: Haijun Yu, Guangdong (CN); Changdong Li, Guangdong (CN); Yinghao Xie, Guangdong (CN); Xuemei Zhang, Guangdong (CN); Kang Chen, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP VEHICLES RECYCLING CO., LTD., Hunan (CN)

( * ) Notice: Subject to any disclaimer, the term of this patent is extended or adjusted under 35 U.S.C. 154(b) by 112 days.

(21) Appl. No.: 18/558,019

(22) PCT Filed: Dec. 30, 2021

(86) PCT No.: PCT/CN2021/142955
§ 371 (c)(1),
(2) Date: Oct. 30, 2023

(87) PCT Pub. No.: WO2022/267425
PCT Pub. Date: Dec. 29, 2022

(65) Prior Publication Data
US 2024/0250352 A1    Jul. 25, 2024

(30) Foreign Application Priority Data

Jun. 25, 2021    (CN) .......................... 202110712374.6

(51) Int. Cl.
B65D 88/64  (2006.01)
C22B 3/02   (2006.01)
(Continued)

(52) U.S. Cl.
CPC ............... H01M 50/14 (2021.01); C22B 3/02 (2013.01); C22B 7/007 (2013.01); H01M 10/0422 (2013.01); H01M 50/256 (2021.01)

(58) Field of Classification Search
CPC ... C22B 3/02; C22B 3/04; C22B 7/007; Y02P 10/20; Y02W 30/84; B65D 88/66
See application file for complete search history.

(56) References Cited

U.S. PATENT DOCUMENTS 3,618,830 A * 11/1971 Bex .................. B65D 88/66
                                           222/409
4,470,525 A *  9/1984 Daw .................. B65D 88/66
                                           222/200

(Continued)

FOREIGN PATENT DOCUMENTS

CN     207566233     7/2018
CN     207759724     8/2018
(Continued)

OTHER PUBLICATIONS

International Search Report and Written Opinion issued for the PCT application No. PCT/CN2021/142955 on Mar. 29, 2022 with English translation (13 pages).

(Continued)

Primary Examiner — Paul R Durand
Assistant Examiner — Randall A Gruby
(74) Attorney, Agent, or Firm — Leason Ellis LLP

(57) ABSTRACT

Disclosed is a dust-proof safe feeding device for power battery black powder acid leaching feeding, including a (Continued)

leaching tank, a blanking grid and a material shaking assembly, where the leaching tank includes a feeding port; the blanking grid is mounted in the feeding port, and the blanking grid is provided with a blanking hole; the material shaking assembly includes a material shaking member and a driving device, the material shaking member is movably arranged in the blanking hole, the driving device is connected with the material shaking member, and the driving device is configured to drive the material shaking member to move in the blanking hole.

9 Claims, 7 Drawing Sheets

(51) Int. Cl.
    *C22B 7/00*         (2006.01)
    *H01M 10/04*     (2006.01)
    *H01M 50/14*     (2021.01)
    *H01M 50/256*    (2021.01)

(56) References Cited

U.S. PATENT DOCUMENTS

| | | | |
|---|---|---|---|
| 12,297,050 B2 * | 5/2025 | Garcia | B65G 47/82 |
| 12,308,403 B2 * | 5/2025 | Xie | B04B 9/02 |
| 2024/0043958 A1 * | 2/2024 | Yu | C22B 3/02 |
| 2024/0250352 A1 * | 7/2024 | Yu | C22B 3/02 |

FOREIGN PATENT DOCUMENTS

| | | |
|---|---|---|
| CN | 210438101 | 5/2020 |
| CN | 210709744 | 6/2020 |
| CN | 113387194 | 9/2021 |
| FR | 2648443 | 12/1990 |
| HU | 231588 B1 | 12/2024 |

OTHER PUBLICATIONS

Notice of Publication and Search Report of HU2200309A1 with English translation on Feb. 5, 2023 (8 pages).

Novelty Search Report in PCT Application No. PCT/CN21/142955, mailed Apr. 20, 2023, an English Translation attached hereto (8 pages).

Notification of Substantive Examination in PCT Application No. PCT/CN21/142955, mailed Nov. 22, 2023, an English Translation attached hereto (8 pages).

Grant Decision in PCT Application No. PCT/CN21/142955, mailed Nov. 7, 2024, an English Translation attached hereto (5 pages).

Communication about Intention to Grant in PCT Application No. PCT/CN21/142955, mailed Jul. 12, 2024, an English Translation attached hereto (5 pages).

* cited by examiner

DUSTPROOF SAFETY FEEDING DEVICE FOR POWER BATTERY BLACK POWDER ACID LEACHING AND FEEDING

CROSS-REFERENCE TO RELATED APPLICATION

This application is a national stage filing under 35U.S.C. § 371 of international application number PCT/CN2021/142955, filed Dec. 30, 2021, which claims priority to Chinese patent application No. 202110712374.6 filed Jun. 25, 2021. The contents of these applications are incorporated herein by reference in their entirety.

TECHNICAL FIELD

The present disclosure relates to the technical field of recycling in new energy material industry, and particularly relates to a dust-proof safe feeding device for power battery black powder acid leaching feeding.

BACKGROUND

After being crushed and sorted, battery components need to be subject to acid leaching in a pickling tank to remove impurities such as copper, iron and aluminum, and put the battery powder into a leaching tank for reaction. The current process of putting the battery powder into the pickling tank has the following defects: a feeding port of a pickling device is large without effective protection, so that an operator is prone to fall into the feeding port during working.

SUMMARY

The present disclosure aims at solving at least one of the above-mentioned technical problems in the prior art. Therefore, the present disclosure provides a dust-proof safe feeding device for power battery black powder acid leaching feeding, which prevents an operator from falling into a feeding port.

According to an embodiment of a first aspect of the present disclosure, a dust-proof safe feeding device for power battery black powder acid leaching feeding includes a leaching tank, a blanking grid and a material shaking assembly, wherein the leaching tank includes a feeding port; the blanking grid is mounted in the feeding port, and the blanking grid is provided with a blanking hole; the material shaking assembly includes a material shaking member and a driving device, the material shaking member is movably arranged in the blanking hole, the driving device is connected with the material shaking member, and the driving device is configured to drive the material shaking member to move in the blanking hole.

According to the embodiment of the present disclosure, the dust-proof safe feeding device for power battery black powder acid leaching feeding at least has the following technical effects: the feeding port is provided with the blanking grid to avoid an operator from falling into the feeding port; and the material shaking member and the driving device are provided to eliminate a bridging phenomenon of battery powder and avoid the battery powder from blocking the feeding port.

According to some embodiments of the present disclosure, the material shaking member is in a "U" shape.

According to some embodiments of the present disclosure, the material shaking member is in a plate shape, and the material shaking member is provided with a plurality of material guiding through holes.

According to some embodiments of the present disclosure, the material guiding through hole is provided with a bulge at a bottom portion, and two ends of the bulge are inclined planes.

According to some embodiments of the present disclosure, the material shaking assembly further includes a material shaking plate, the material shaking member is mounted on the material shaking plate, the driving device includes a plurality of eccentric wheels and a motor, the material shaking plate is mounted on the leaching tank through the plurality of eccentric wheels, and the motor is configured to drive the eccentric wheels to rotate.

According to some embodiments of the present disclosure, the dust-proof safe feeding device for power battery black powder acid leaching feeding further includes an opening and closing assembly, wherein the opening and closing assembly is mounted in the feeding port and is located below the blanking grid, the opening and closing assembly includes a feeding rotor rotatably mounted in the feeding port, the feeding rotor is provided with at least one holding tank, and an outer surface of the feeding rotor abuts against an inner surface of the feeding port, so that the feeding rotor seals the feeding port.

According to some embodiments of the present disclosure, the opening and closing assembly further includes a fixation cylinder, the fixation cylinder is mounted in the feeding port and an outer surface of the fixation cylinder is hermetically and fixedly connected with the inner surface of the feeding port, the fixation cylinder is provided with a feed hole and a discharge hole communicated with the feeding port, the feeding rotor is located in the fixation cylinder, and the outer surface of the feeding rotor abuts against an inner surface of the fixation cylinder.

According to some embodiments of the present disclosure, the feeding rotor includes an opening and closing plate and an arc-shaped plate, the arc-shaped plate is arranged at two ends of the opening and closing plate, the arc-shaped plate and the opening and closing plate enclose the holding tank, the feeding port and the discharge hole are both arc-shaped openings, and an arc length between two ends of the arc-shaped plate is longer than that between two ends of the arc-shaped opening.

According to some embodiments of the present disclosure, the arc-shaped plate is provided with a balance hole, a cross section of the balance hole is tapered, and a large hole end of the balance hole is close to an inner wall of the fixation cylinder.

According to some embodiments of the present disclosure, the dust-proof safe feeding device for power battery black powder acid leaching feeding further includes a gas extraction device arranged on the leaching tank, wherein the gas extraction device is configured to extract gas in the leaching tank.

Part of the additional aspects and advantages of the present disclosure will be given in part in the following description, and will become apparent in part from the following description, or will be learned through the practice of the present disclosure.

BRIEF DESCRIPTION OF DRAWINGS

The additional aspects and advantages of the present disclosure will become apparent from the following description of embodiments taken in conjunction with the accompanying drawings, wherein.

Figure 1:
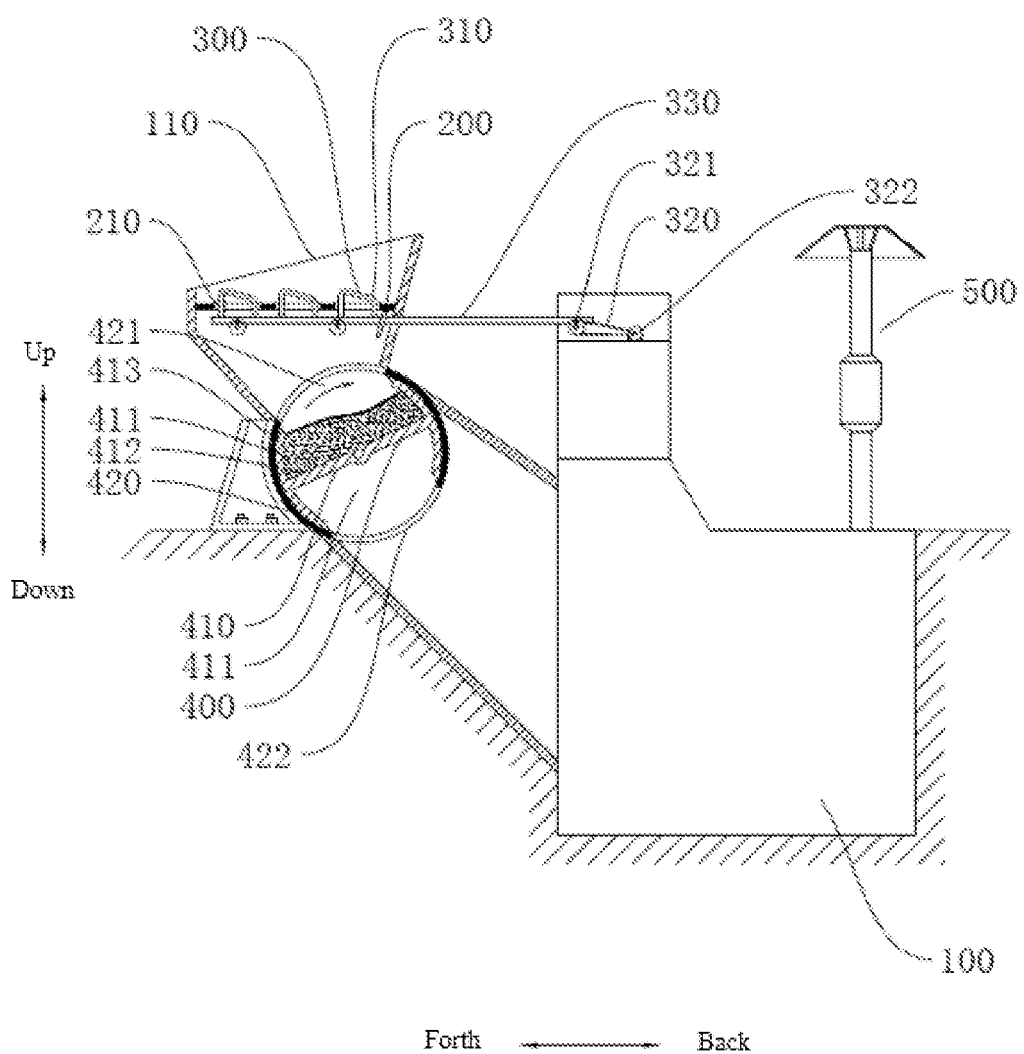
FIG. 1 is a schematic structural diagram of a dust-proof safe feeding device for power battery black powder acid leaching feeding according to an embodiment of the present disclosure.

Reference numerals: 100 refers to leaching tank, 110 refers to feeding port, 200 refers to blanking grid, 210 refers to blanking hole, 300 refers to material shaking assembly, 310 refers to material shaking member, 311 refers to material guiding through hole, 3111 refers to bulge, 320 refers to driving device, 321 refers to eccentric wheel, 322 refers to motor, 330 refers to material shaking plate, 400 refers to opening and closing assembly, 410 refers to feeding rotor, 411 refers to holding tank, 412 refers to opening and closing plate, 413 refers to arc-shaped plate, 414 refers to sealing strip, 420 refers to fixation cylinder, 421 refers to feed hole, 422 refers to discharge hole, and 500 refers to gas extraction device.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present disclosure, but should not be construed as limiting the present disclosure.

In the description of the present disclosure, the meaning of multiple refers to be more than two. The meanings of greater than, less than, more than, etc., are understood as not including this number. It should be understood that the orientation or position relation related to the orientation description, such as the orientation or position relation indicated by the upper, lower, front, rear, left, right, and middle, etc., is based on the orientation or position relation shown the drawings, which is only used for convenience of description of the present disclosure and simplification of description instead of indicating or implying that the indicated device or element must have a specific orientation, and be constructed and operated in a specific orientation, and thus shall not be understood as a limitation to the present disclosure.

In the description of the present disclosure, unless otherwise clearly defined, words such as installation, connection, etc., shall be understood broadly, and those skilled the art can reasonably determine the specific meanings of the above words in the present disclosure in combination with the specific contents of the technical solution.

With reference to FIG. 1, a dust-proof safe feeding device for power battery black powder acid leaching feeding according to an embodiment of the present disclosure includes a leaching tank 100, a blanking grid 200 and a material shaking assembly 300. The leaching tank 100 includes a feeding port 110. The blanking grid 200 is mounted in the feeding port 110, and the blanking grid 200 is provided with a blanking hole 210. The material shaking assembly 300 includes a material shaking member 310 and a driving device 320, the material shaking member 310 is movably arranged in the blanking hole 210, the driving device 320 is connected with the material shaking member 310, and the driving device 320 is configured to drive the material shaking member 310 to move in the blanking hole 210.

Figure 2:
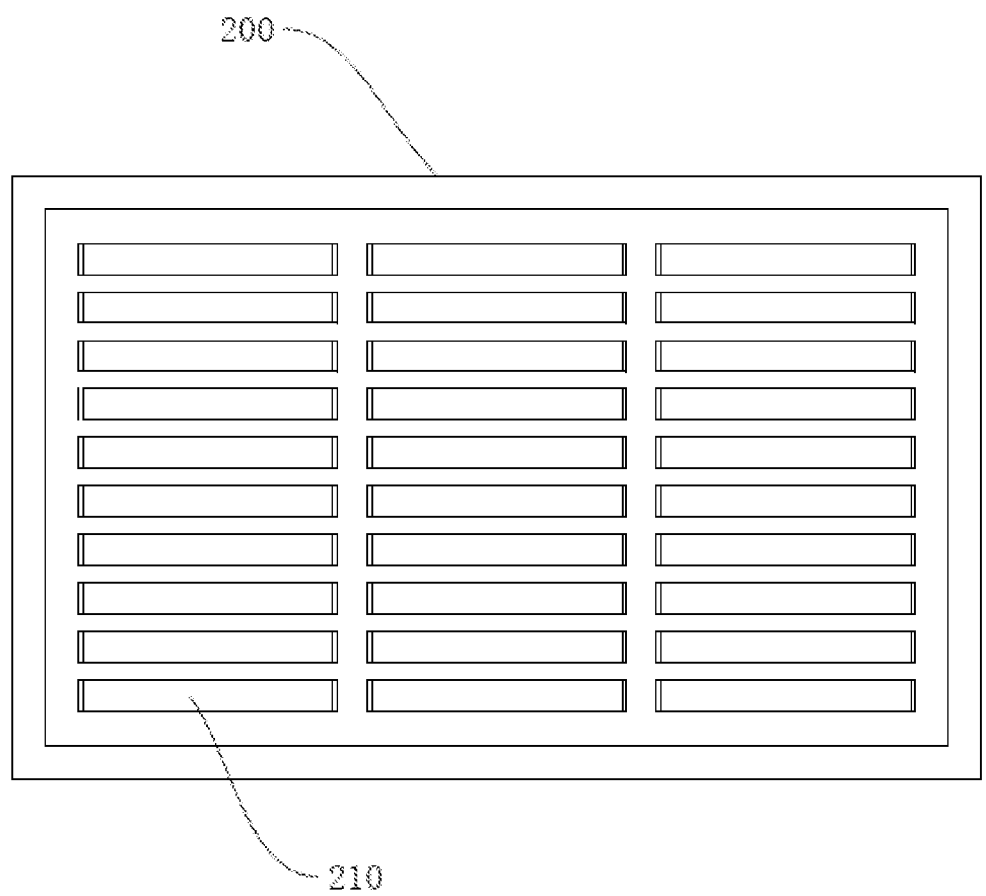
FIG. 2 is a schematic structural diagram of a blanking grid.
Figure 3:
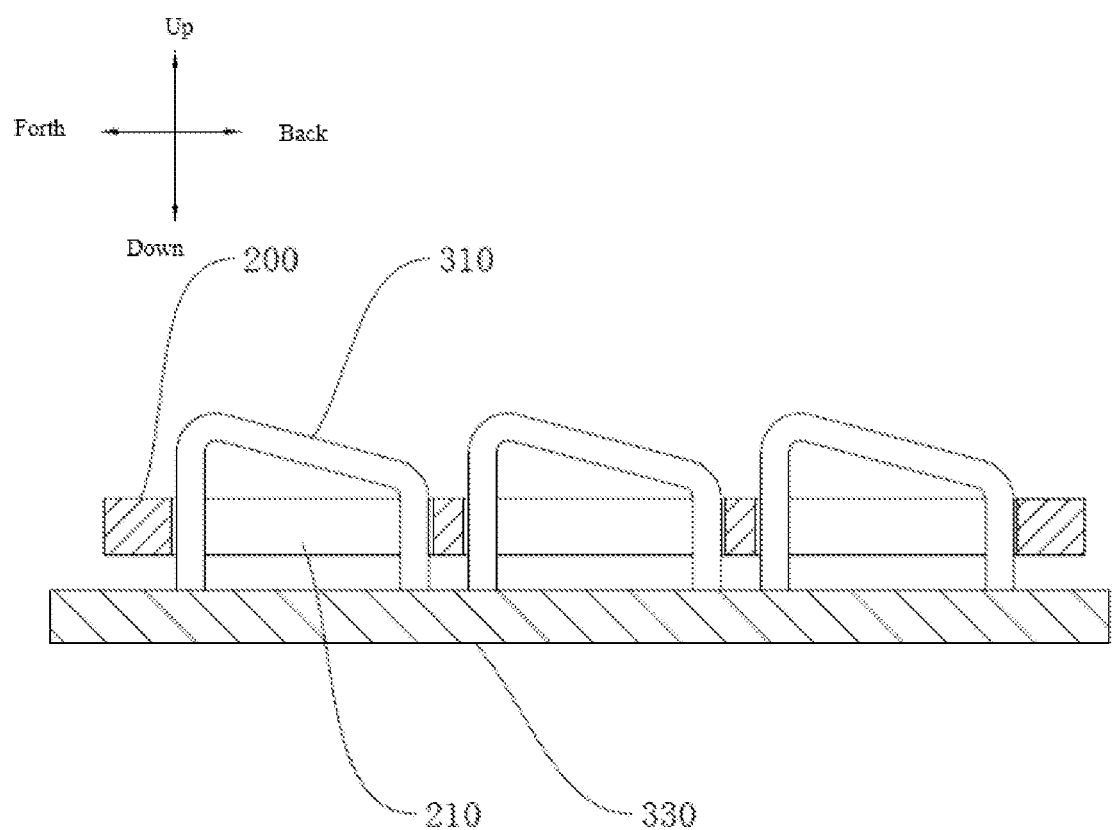
FIG. 3 is a schematic structural diagram of a material shaking member located in a blanking hole according to a first embodiment.
Figure 4:
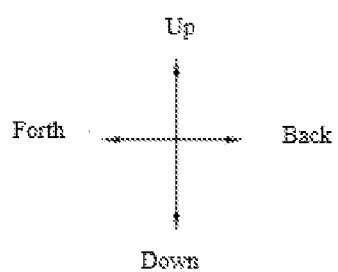
FIG. 4 is a schematic structural diagram of a material shaking member located in a blanking hole according to a second embodiment.
Figure 4:
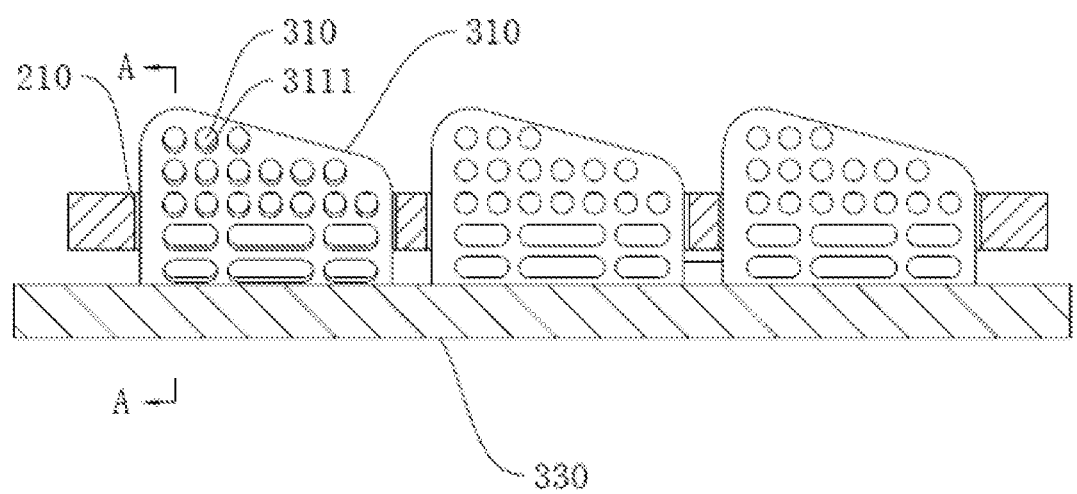

For example, as shown in FIG. 1, one end of the leaching tank 100 is a conveying pipe, the feeding port 110 is located at an upper end of the conveying pipe, and the blanking grid 200 is mounted in the feeding port 110. As shown in FIG. 2, a plurality of blanking holes 210 are provided, and a number of material shaking members 310 corresponds to a number of blanking holes 210. Since the feeding port 110 of a pickling device is large and is provided with the blanking grid 200 to effectively protect an operator, the operator is avoided from falling into the feeding port 110 to be in a dangerous situation. Since the blanking grid 200 is provided, when there is too much battery powder, a bridging phenomenon is easy to occur, so that the battery powder cannot enter the leaching tank 100. As shown in FIG. 3 and FIG. 4, the material shaking member 310 of the present disclosure is movably arranged in the blanking hole 210. When the bridging occurs, the driving device 320 drives the material shaking member 310 to move up and down, back and forth, or up and down as well as back and forth in the blanking hole 210, and then the movement of the material shaking member 310 eliminates the bridging phenomenon of the battery powder, thus avoiding the battery powder from blocking the feeding port 110. The blanking grid 200 is combined with the material shaking member 310 to avoid the battery powder from blocking the feeding port 110, which plays a role of a protective fence, thus avoiding the operator from falling into the feeding port 110.

In some embodiments of the present disclosure, the material shaking member 310 is in a "U" shape. As shown in FIG. 3, the "U" shape is conductive to quick falling of the battery powder.

In some embodiments of the present disclosure, as shown in FIG. 4, the material shaking member 310 is in a plate shape, and the material shaking member 310 is provided with a plurality of material guiding through holes 311.

Figure 5:
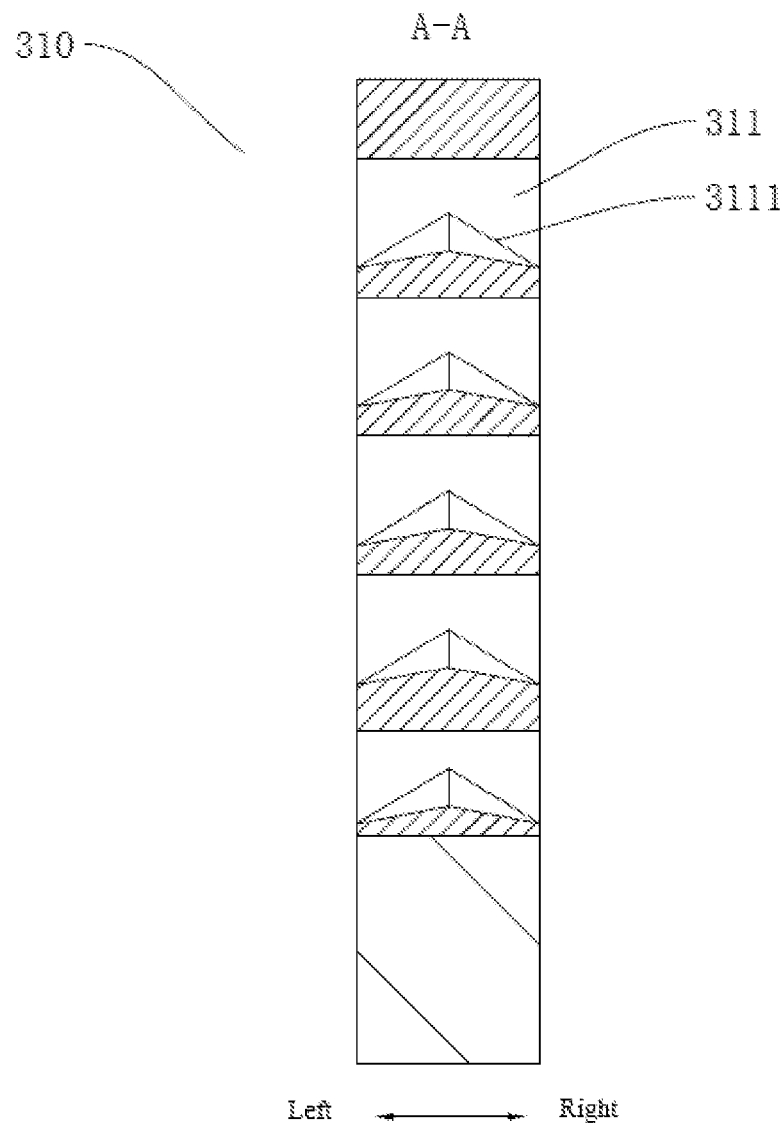
FIG. 5 is a cross-sectional view of A-A in FIG. 4.

In a further embodiment of the present disclosure, as shown in FIG. 4 and FIG. 5, the material guiding through hole 311 is provided with a bulge 3111 at a bottom portion, and two ends of the bulge 3111 are inclined planes. Left and right ends of the bulge 3111 are the inclined planes, and an inclined plane structure is conductive to falling of the battery powder.

In a further embodiment of the present disclosure, as shown in FIG. 1, the material shaking assembly 300 further includes a material shaking plate 330, and the material shaking member 310 is mounted on the material shaking plate 330. The driving device 320 includes a plurality of eccentric wheels 321 and a motor 322, the material shaking plate 330 is mounted on the leaching tank 100 through the plurality of eccentric wheels 321, and the motor 322 is configured to drive the eccentric wheels 321 to rotate. The material shaking plate 330 is connected with the eccentric wheels 321, and the motor 322 is configured to drive the eccentric wheels 321 so as to drive the material shaking plate 330 to move, so that a material shaking frame moves back and forth as well as up and down relative to the blanking grid 200. This structure is simple and convenient to maintain. For example, one of the eccentric wheels 321 is mounted on the leaching tank 100, the motor 322 is mounted on the leaching tank 100 and is configured to drive the above eccentric wheel 321, one end of the material shaking plate 330 extends into the feeding port 110 and is mounted in the feeding port 110 through other eccentric wheels 321, and the other end of the material shaking plate 330 is connected with the motor 322.

In a further embodiment of the present disclosure, as shown in FIG. 1, the dust-proof safe feeding device for power battery black powder acid leaching feeding further includes an opening and closing assembly 400. The opening and closing assembly 400 is mounted in the feeding port 110 and is located below the blanking grid 200, the opening and closing assembly 400 includes a feeding rotor 410 rotatably mounted in the feeding port 110, the feeding rotor 410 is provided with at least one holding tank 411, and an outer surface of the feeding rotor 410 abuts against an inner surface of the feeding port 110, so that the feeding rotor 410 seals the feeding port 110.

The process of putting the battery powder into a pickling tank in current art still has the following defects.

In the feeding process, it is easy to accumulate a reactant oxygen in the reaction tank ($3H_2SO_4+H_2O_2+2LiCoO_2 \rightarrow 2CoSO_4+Li_2SO_4+4H_2O+O_2\uparrow$), because oxygen may be generated during feeding. The feeding port 110 needs to be opened during feeding, which may lead to oxygen leakage, and direct discharge of oxygen from a feeding opening is easy to cause a danger, thus being unsafe for a feeding staff. In current art, the feeding ports 110 are all open type, which is unsafe due to easy overflow of oxygen, and putting dried battery powder is easy to cause raised dust, which is easy to cause air pollution and endangers health of the operator.

The opening and closing assembly 400 is provided in the present disclosure, so that a feeding process is completely sealed, thus avoiding oxygen leakage and raised dust.

For example, two ends of the feeding rotor 410 are hinged in the conveying pipe, the feeding rotor 410 is driven to rotate by the motor 322, the holding tank 411 is used for holding the battery powder, and the holding tank 411 may be in a V shape, a U shape, or other shapes capable of holding a battery powder.

In operation, materials are received when a notch of the holding tank 411 faces upwardly, and the battery powder in the holding tank 411 falls into the leaching tank 100 along the conveying pipe when the notch faces downwardly. The feeding rotor 410 is circularly rotated, so that the battery powder is repeatedly conveyed. Since an outer surface of the feeding rotor 410 abuts against an inner surface of the feeding port 110, relative sealing can be maintained in a circular and continuous feeding process.

Figure 6:
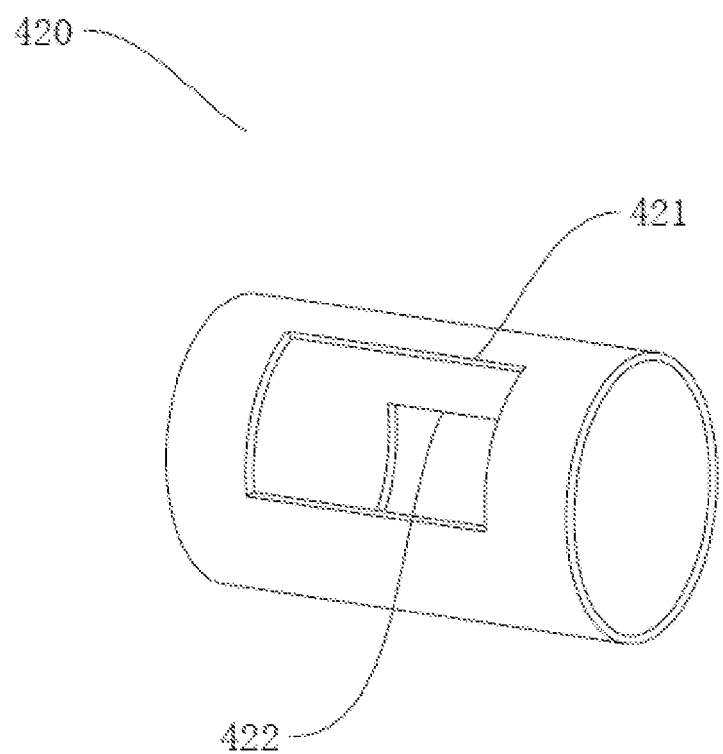
FIG. 6 is a schematic structural diagram of a fixation cylinder.

In a further embodiment of the present disclosure, as shown in FIG. 1 and FIG. 6, the opening and closing assembly 400 further includes a fixation cylinder 420, the fixation cylinder 420 is mounted in the feeding port 110 and an outer surface of the fixation cylinder 420 is hermetically and fixedly connected with the inner surface of the feeding port 110, the fixation cylinder 420 is provided with a feed hole 421 and a discharge hole 422 communicated with the feeding port 110, the feeding rotor 410 is located in the fixation cylinder 420, and the outer surface of the feeding rotor 410 abuts against an inner surface of the fixation cylinder 420.

In operation, the driving device 320 drives the notch of the holding tank 411 to face upwardly, the battery powder enters the holding tank 411 of the feeding rotor 410 through the feed hole 421, then the driving device 320 drives the notch of the holding tank 411 to face downwardly, and the battery powder is poured out from the discharge hole 422.

In a further embodiment of the present disclosure, as shown in FIG. 1, the feeding rotor 410 includes an opening and closing plate 412 and an arc-shaped plate 413, the arc-shaped plate 413 is arranged at two ends of the opening and closing plate 412, the arc-shaped plate 413 and the opening and closing plate 412 enclose the holding tank 411, the feeding port 110 and the discharge hole 422 are both arc-shaped openings, and an arc length between two ends of the arc-shaped plate 413 is longer than that between two ends of the arc-shaped opening. The arc length between two ends of the arc-shaped plate 413 is longer than that between two ends of the arc-shaped opening, which can ensure sealing during rotation of the feeding rotor 410, thus avoiding oxygen leakage and raised dust.

In a further embodiment of the present disclosure, the arc-shaped plate 413 is provided with a balance hole (not shown in the drawings), a cross section of the balance hole is tapered, and a large hole end of the balance hole is close to an inner wall of the fixation cylinder 420. The balance hole is provided, so that when the arc-shaped plate 413 is located at the discharge hole 422 of the fixation cylinder 420 and blocks a lower opening, the balance hole may balance air pressures inside and outside the leaching tank 100, and external air may flow into the leaching tank 100 under an action of a negative pressure.

Figure 7:
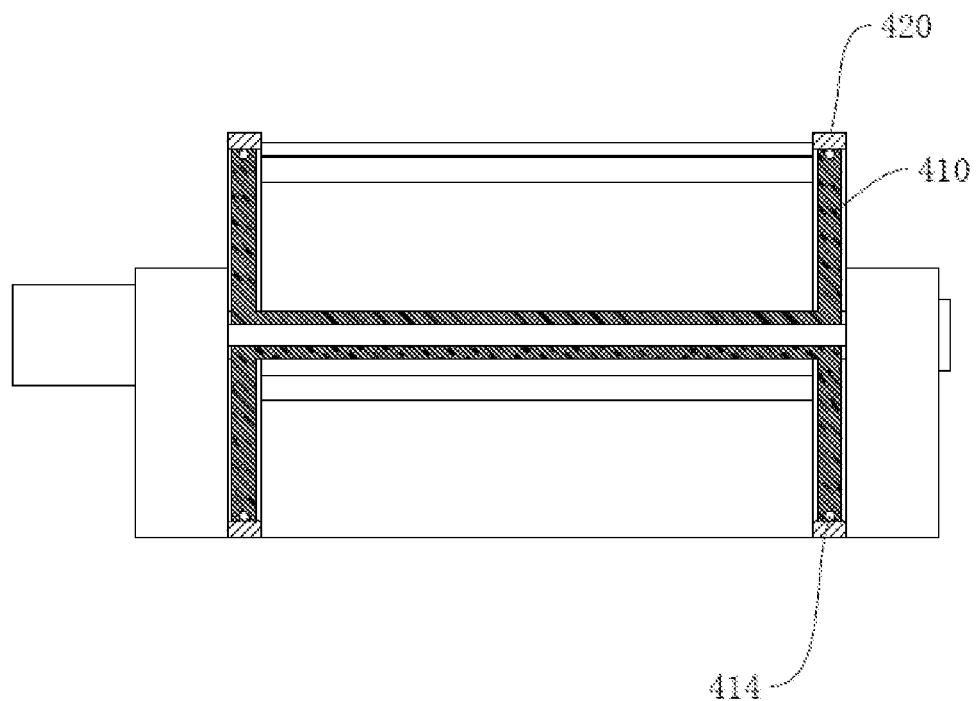
FIG. 7 is a cross-sectional view of a feeding rotor in the fixation cylinder.

In a further embodiment of the present disclosure, as shown in FIG. 7, one end of the feeding rotor 410 abutting against the inner wall of the fixation cylinder 420 is provided with a scaling strip 414. The sealing strip 414 is provided to improve a sealing effect between the feeding rotor 410 and the fixation cylinder 420.

In a further embodiment of the present disclosure, as shown in FIG. 1, the dust-proof safe feeding device for power battery black powder acid leaching feeding further includes a gas extraction device 500 mounted on the leaching tank 100. The gas extraction device 500 is configured to extract gas in the leaching tank 100. The gas extraction device 500 continuously extracts gas inside the leaching tank 100 to maintain a negative pressure inside the leaching tank 100, so that no raised dust is discharged from the feeding port 110 during rotating feeding by rotating the feeding rotor 410. Meanwhile, after being collected by a dust bag at an outlet of the gas extraction device 500, the raised dust is continuously fed into the leaching tank 100 from the feeding port 110.

In the description of the specification, the descriptions of the reference terms "some embodiments", "it is conceivable that", etc. refer to that the specific features, structures, materials characteristics described in combination with the embodiment or example are included in at least one embodiment or example of the present disclosure. In the specification, the schematic representation of the above terms does not necessarily mean the same embodiment or example. Moreover, the specific features, structures, materials or characteristics described may be combined in any one or more embodiments or examples in a suitable manner.

Although the embodiments of the present disclosure have been shown and described, those of ordinary skills in the art should understand that: various changes, amendments, substitutions and modifications can be made to these embodiments without departing from the principles and purposes of the present disclosure, and the scope of the present disclosure is limited by the claims and equivalents thereof.

The invention claimed is:

1. A dust-proof safe feeding device for power battery black powder acid leaching feeding, comprising:
   a leaching tank comprising a feeding port;
   a blanking grid mounted in the feeding port, wherein the blanking grid is provided with a blanking hole; and
   a material shaking assembly comprising a material shaking member and a driving device, wherein the material shaking member is movably arranged in the blanking hole, the material shaking assembly further comprises a material shaking plate, the material shaking member is mounted on the material shaking plate, the driving device comprises a plurality of eccentric wheels and a motor, the material shaking plate is mounted on the leaching tank through the plurality of eccentric wheels, and the motor is connected to the eccentric wheels and configured to drive the eccentric wheels to rotate so as to drive the material shaking member to move in the blanking hole.

2. The dust-proof safe feeding device for power battery black powder acid leaching feeding according to claim 1, wherein the material shaking member is in a "U" shape.

3. The dust-proof safe feeding device for power battery black powder acid leaching feeding according to claim 1, wherein the material shaking member is in a plate shape, and the material shaking member is provided with a plurality of material guiding through holes.

4. The dust-proof safe feeding device for power battery black powder acid leaching feeding according to claim 3, wherein the material guiding through hole is provided with a bulge at a bottom portion, and two ends of the bulge are inclined planes.

5. The dust-proof safe feeding device for power battery black powder acid leaching feeding according to claim 1, further comprising an opening and closing assembly, wherein the opening and closing assembly is mounted in the feeding port and is located below the blanking grid, the opening and closing assembly comprises a feeding rotor rotatably mounted in the feeding port, the feeding rotor is provided with at least one holding tank, and an outer surface of the feeding rotor abuts against an inner surface of the feeding port, so that the feeding rotor seals the feeding port.

6. The dust-proof safe feeding device for power battery black powder acid leaching feeding according to claim 5, wherein the opening and closing assembly further comprises a fixation cylinder, the fixation cylinder is mounted in the feeding port and an outer surface of the fixation cylinder is hermetically and fixedly connected with the inner surface of the feeding port, the fixation cylinder is provided with a feed hole and a discharge hole communicated with the feeding port, the feeding rotor is located in the fixation cylinder, and the outer surface of the feeding rotor abuts against an inner surface of the fixation cylinder.

7. The dust-proof safe feeding device for power battery black powder acid leaching feeding according to claim 6, wherein the feeding rotor comprises an opening and closing plate and an arc-shaped plate, the arc-shaped plate is arranged at two ends of the opening and closing plate, the arc-shaped plate and the opening and closing plate enclose the holding tank, the feeding port and the discharge hole are both arc-shaped openings, and an arc length between two ends of the arc-shaped plate is longer than that between two ends of the arc-shaped opening.

8. The dust-proof safe feeding device for power battery black powder acid leaching feeding according to claim 7, wherein the arc-shaped plate is provided with a balance hole, a cross section of the balance hole is tapered, and a large hole end of the balance hole is close to an inner wall of the fixation cylinder.

9. The dust-proof safe feeding device for power battery black powder acid leaching feeding according to claim 1, further comprising a gas extraction device mounted on the leaching tank and being in fluid communication with the leaching tank, wherein the gas extraction device is configured to extract gas in the leaching tank.

* * * * *